Oct. 29, 1957 L. L. LA BARRE 2,811,321
TRUCK TARPAULIN REEL
Filed May 20, 1955 4 Sheets-Sheet 1

Leo L. LaBarre
INVENTOR.

BY *Clarence A. O'Brien
and Harvey B. Jacobson*
Attorneys

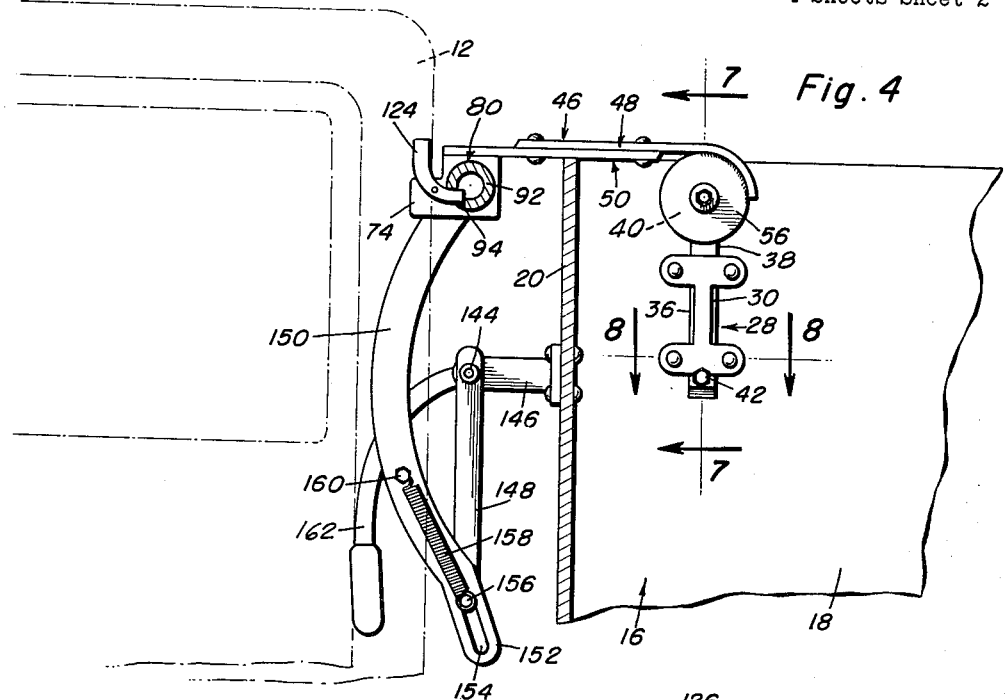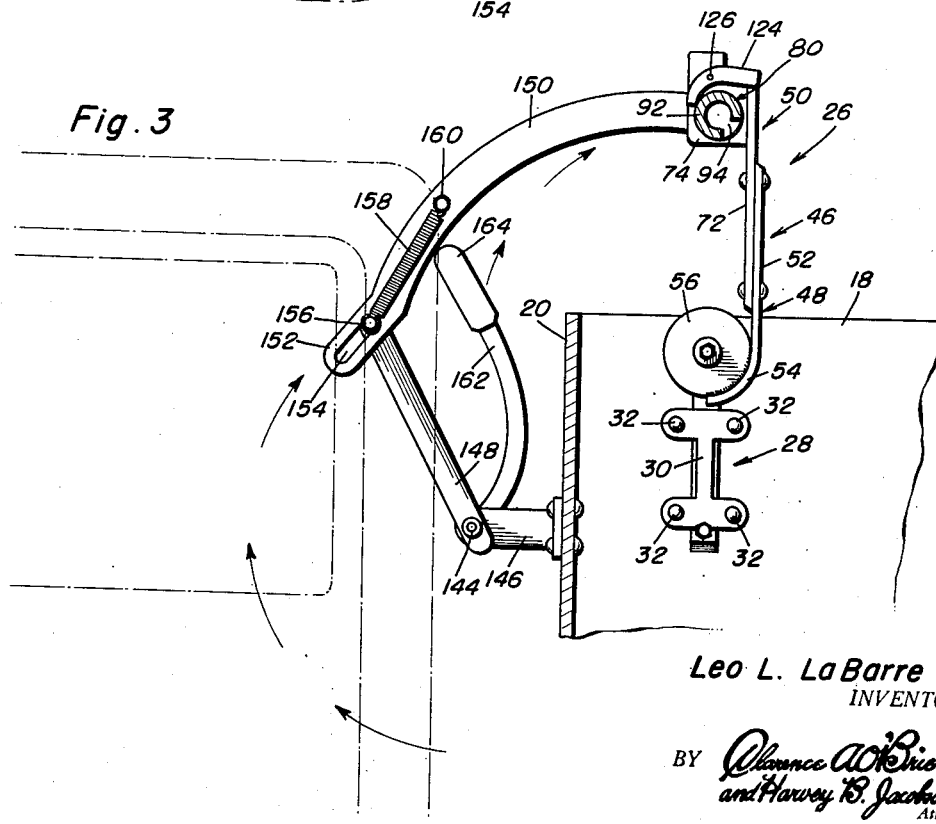

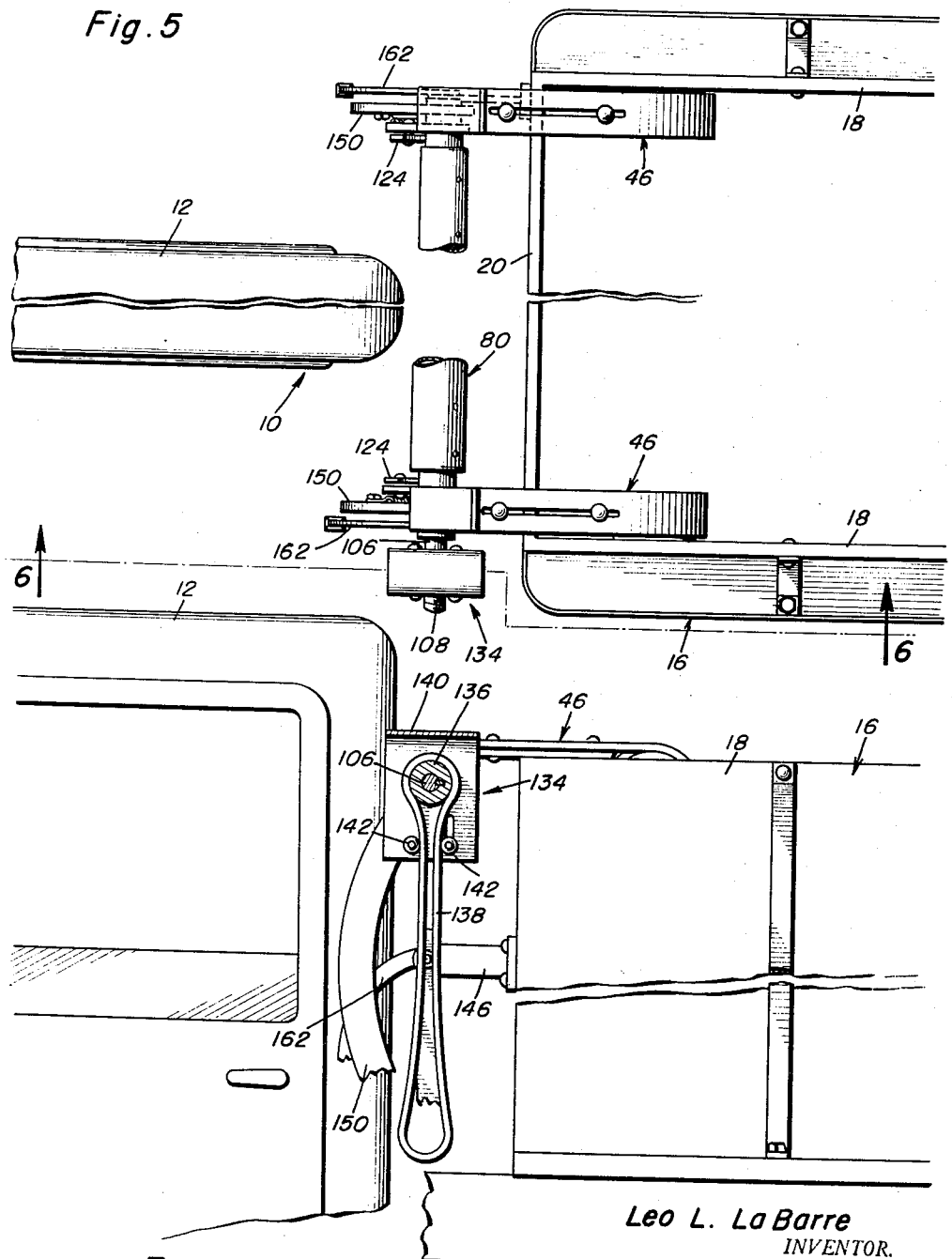

Oct. 29, 1957  L. L. LA BARRE  2,811,321
TRUCK TARPAULIN REEL
Filed May 20, 1955  4 Sheets-Sheet 4
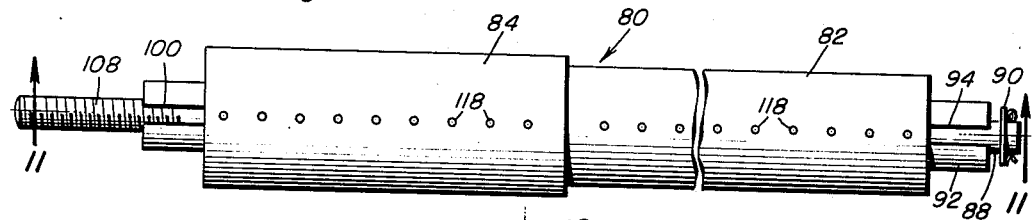
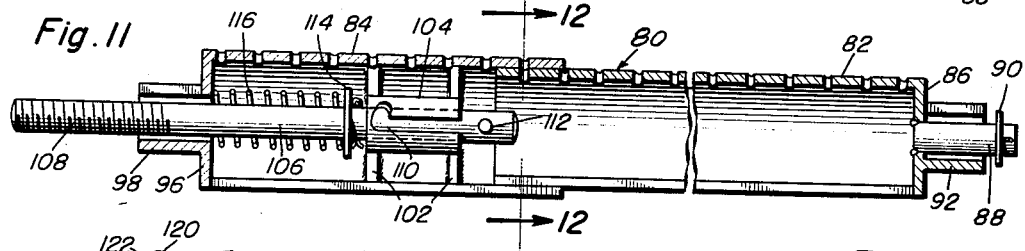
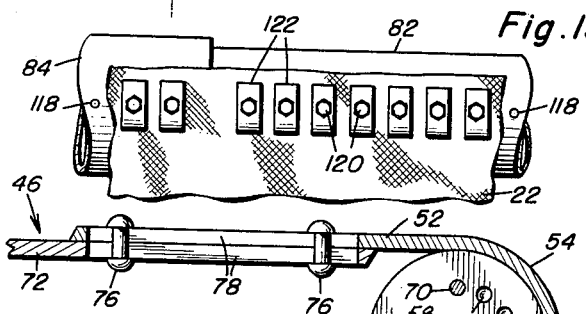
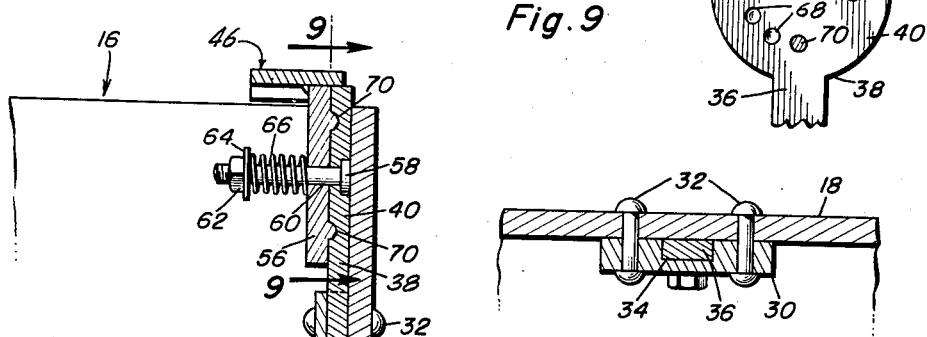
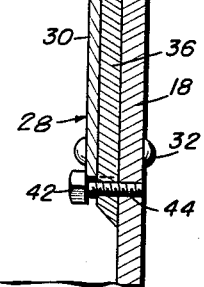
Leo L. La Barre
INVENTOR.
BY *Clarence A. O'Brien*
*and Harvey B. Jacobson*
Attorneys

United States Patent Office 2,811,321
Patented Oct. 29, 1957

2,811,321

TRUCK TARPAULIN REEL

Leo L. La Barre, Webster, N. Dak.

Application May 20, 1955, Serial No. 509,767

16 Claims. (Cl. 242—86.52)

This invention relates in general to new and useful improvements in truck accessories, and more specifically to a reel for truck tarpaulins intended to cover open top truck bodies.

In order to facilitate loading and unloading many truck bodies are of the open top type. Such truck bodies are used both on the farm and for commercial purposes. In order to prevent the blowing away of grain and the like the truck body is used for farm purposes, and to protect the contents of the truck body against the elements, the top of the truck body is oftentimes covered by a tarpaulin which will extend over the top of the truck body between the sides thereof the full length of the truck body. Inasmuch as the tarpaulin must be removed during loading and unloading operations, it is highly desirable that there be provided a suitable reel mechanism for installing the tarpaulin. Such reel mechanisms have been utilized in the past, but have proved to be disadvantageous in that they are in the way when the tarpaulin is stored and do not provide means for suitably stretching the tarpaulin to fully protect the front part of the truck body.

It is therefore the primary object of this invention to provide an improved tarpaulin reel for truck bodies, the tarpaulin reel being provided with mounting means whereby it may be selectively positioned in overlying relation with respect to the front portion of the truck body during the storing of the tarpaulin, and may be moved to a position forwardly of and below the upper forward edge of the truck body for tightly tensioning the tarpaulin and holding it in contact with the front part of the truck body.

Another object of this invention is to provide an improved tarpaulin reel which is so proportioned and so mounted whereby when the tarpaulin is in an extended position, the tarpaulin reel may be positioned between the cab of the truck and the truck body, such space being relatively small.

Another object of this invention is to provide an improved operating mechanism for selectively rotating a tarpaulin reel, the operating mechanism being retractible with respect to the reel so that it normally will be disposed within the longitudinal projections of a truck body when in an inoperative position.

A further object of this invention is to provide an improved mounting mechanism for tarpaulin reels which is of such a nature whereby a tarpaulin reel may be quickly and easily removed from the truck body to which it is attached.

A still further object of this invention is to provide an improved tarpaulin reel construction which includes means for selectively positioning the tarpaulin reel, the means being in the form of linkage operable by a crank handle to effect pivoting of support arms for the tarpaulin reel.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
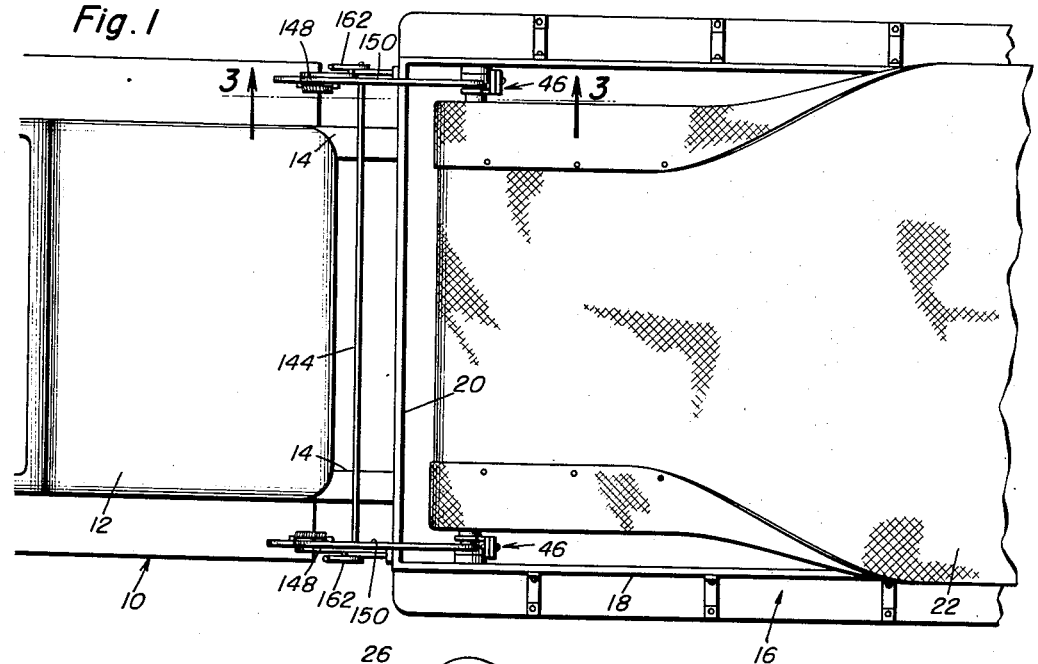
Figure 1 is a top plan view of a forward portion of a truck body and the cab of such truck and shows positioned on the forward part of the truck body the tarpaulin reel which is the subject of this invention, the tarpaulin being in the process of being unreeled therefrom.
Figure 14:
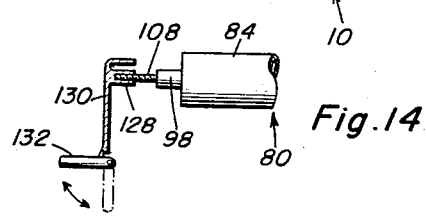

Figure 3 is an enlarged fragmentary vertical sectional view through the upper forward part of the truck body and shows the specific details of the mounting for the tarpaulin reel including latch means for preventing rotation of such reel, only an end shaft portion of the reel proper being illustrated, the cab of the truck being shown in broken lines in order to clearly illustrate the means for pivoting the tarpaulin reel from one position to another, the tarpaulin reel being shown in a tarpaulin reeling position;

Figure 4 is an enlarged fragmentary vertical sectional view similar to Figure 3 and shows the tarpaulin reel pivoted to a tarpaulin tensioning position;

Figure 5 is an enlarged fragmentary top plan view of those portions of the truck corresponding to Figure 3 and shows the details of the tarpaulin reel when the reel is in the tarpaulin stretching position, longitudinal central portions of the cab, the truck body and the reel being omitted, the reel being provided with a modified form of drive means;

Figure 6 is an enlarged fragmentary sectional view taken substantially upon the plane indicated by the section line 6—6 of Figure 5 and shows the specific details of the drive means for selectively rotating the tarpaulin reel;

Figure 7 is an enlarged fragmentary vertical sectional view taken substantially upon the plane indicated by the section line 7—7 of Figure 4 and shows the specific details of a support bracket holding the tarpaulin reel and the relationship thereof with respect to a support arm;

Figure 8 is an enlarged fragmentary horizontal sectional view taken substantially upon the plane indicated by the section line 8—8 of Figure 4 and shows the manner in which portions of the support bracket are slidably connected together;

Figure 9 is an enlarged fragmentary sectional view taken substantially upon the plane indicated by the section line 9—9 of Figure 7 and shows the interlocked connection between the support arm and the support bracket for retaining the support arm in an adjusted position with respect to the support bracket;

Figure 10 is an enlarged elevational view of the tarpaulin reel per se and shows the general details thereof, an intermediate portion of one section of the tarpaulin reel being broken away;

Figure 11 is an enlarged longitudinal sectional view taken substantially upon the plane indicated by the section line 11—11 of Figure 10 and shows the specific connection between a drive shaft for the tarpaulin reel and the tarpaulin reel;

Figure 12 is an enlarged transverse vertical sectional view taken substantially upon the plane indicated by the section line 12—12 and shows the tarpaulin clamped to the tarpaulin reel;

Figure 13 is an enlarged fragmentary top plan view of the tarpaulin reel and shows attached to the same the tarpaulin in the manner illustrated in Figure 12; and Figure 14 is a fragmentary elevational view showing the form of drive means of Fig. 1 for rotating the drive shaft of the tarpaulin reel.

Referring now to the drawings in detail, it will be seen that there is illustrated the body portion of a conventional type of truck which is referred to in general by the reference numeral 10. The truck 10 includes a cab 12 which is mounted on a frame 14. Mounted on the frame 14 slightly rearwardly of the cab 12 is an open top truck body which is referred to in general by the reference numeral 16. The truck body includes side walls 18 and a front wall 20. It is to be noted that the truck body 16 is of a lesser height than the cab 12 and that the upper edge of the front wall 20 is disposed below the top of the truck cab 12. The truck body 16 is primarily intended for farm use and in many instances is used for carrying grains and the like.

In order that grains and other loads carried by the truck body 16 may be prevented from blowing out of the truck body and at the same time may be protected against the elements, there is provided an elongated tarpaulin 22. The tarpaulin 22 is of a length to extend the full length of the truck body 16 and protect the upper part thereof. The tarpaulin 22 is of a width to extend down over the upper portions of the side walls 18 and is secured in place at longitudinally spaced intervals by tie cords 24.

In order to suitably mount the tarpaulin 22, there is provided the tarpaulin reel assembly, which is the subject of this invention, which is referred to in general by the reference numeral 26.

The tarpaulin reel assembly 26 includes a pair of mounting brackets which are referred to in general by the reference numeral 28. The mounting brackets 28 are identical and are secured to inner surfaces of the side walls 18 adjacent the forward ends thereof, as is best illustrated in Figure 3. Each of the mounting brackets 28 includes a fixed first portion 30 which is generally I-shaped in elevation and which is rigidly secured to its associated side wall 18 by a plurality of fasteners 32. The first portion 30 is provided with a vertical slot 34 in which there is drivingly positioned for vertical movement a lower bar part 36 of an upper portion 38. The upper portion 38, as is best illustrated in Figure 9, includes a generally circular head 40. The second or upper portion 38 is removable from the truck body 16 by merely sliding the bar part 36 up through the lower portion 30. The upper portion 38 is retained with respect to the lower portion 30 by a bolt 42. The bolt 42 passes through the lower end part of the bar part 36 and is threadedly engaged in an internally threaded bore 44 formed in the side wall 18. The head of the bolt 42 clamps against the lower portion 30.

Carried by each of the support brackets 28 is a support arm which is referred to in general by the reference numeral 46. The support arm 46 is best illustrated in Figures 3 and 9 and includes a first part 48 and a second part 50.

The first part 48 includes an elongated strap 52 which is curved at one end as at 54. Secured to the underside of the curved portion 54 is a disk 56 which conforms to the head 40. As is best illustrated in Figure 7, the head 40 carries an elongated bolt 58 which passes through a central opening 60 in the disk 56 and projects a considerable distance therefrom. Carried by the end of the bolt 58 is an adjustably threaded nut 62 and washer 64. Disposed between the washer 64 and the disk 56 and mounted on the bolt 58 is a spring 66 which resiliently urges the disk 56 into face-to-face engagement with the head 40.

As is best illustrated in Figure 9, the head 40 is provided with two sets of circumferentially disposed recesses 68 in the face thereof which is normally disposed in engagement with the face of the disk 56. The recesses 68 are hemispherical in shape and have selectively received therein hemispherical projections 70 on the disk 56, as is best illustrated in Figure 7. These projections releasably retain the disk 56 in an adjustable position with respect to the head 40.

The second portion 50 of the support bracket 46 includes an elongated strap 72 which is provided at the end thereof opposite from the first portion 48 with a vertically disposed bearing plate 74. The straps 52 and 72 are disposed in overlying relation, as is best illustrated in Figure 9 and are secured together by fasteners 76. The fasteners 76 are disposed in slots 78 formed in the straps 52 and 72 to permit elongation of the support arms 46 as found necessary.

Referring now to Figures 10, 11 and 12 in particular, it will be seen that there is illustrated the details of the tarpaulin reel which is referred to in general by the reference numeral 80. The tarpaulin reel 80 includes an elongated tubular section 82 which has telescoped over one end thereof a relatively short tubular section 84. The telescoping arrangement between the sections 82 and 84 is such that the reel 80 may be mounted in trucks of various widths.

The reel section 82 has the free end thereof closed by an end wall 86. Extending from the end wall 86 is a stub shaft 88 having a retaining collar 90. The stub shaft 88 is disposed in the bearing plate 74 of an associated end in one of the support arms 46 to permit rotation of the reel 80. Carried by the end wall 86 in partial telescoped relation with respect to the stub shaft 80 is a split sleeve 92. The sleeve 92 presents an opening 94 whose purpose will be set forth in detail hereinafter.

The section 84 is very similar in construction to the section 82 and includes an end wall 96. Carried by the end wall 96 is a split sleeve 98 having a slot 100, the sleeves 92 and 98 being substantially identical.

Disposed within the section 84 is a pair of transverse partitions 102 which have extending therebetween a sleeve 104. The sleeve 104 has extending therethrough and supported thereby an elongated drive shaft 106. The drive shaft 106 is normally disposed in a retracted position with a major portion thereof within the reel section 84. However, a threaded end portion 108 thereof normally projects out through the end wall 96 and through the sleeve 98, as is best illustrated in Figure 11.

The sleeve 104 is provided with a longitudinally disposed J-slot 110. Carried by the inner end of the drive shaft 106 is a pin 112 which is engageable in the J-slot 110 to lock the drive shaft 106 to the reel section 84 through the sleeve 104.

In order that the drive shaft 106 may be normally retained in a retracted position, there is carried by the drive shaft 106 intermediate the end wall 96 in the sleeve 104 a collar 114. Engaging against the collar 14 is a spring 116 which oppositely engages the end wall 96 and which is telescoped over the intermediate portion of the drive shaft 106.

Referring now to Figures 10, 12 and 13 in particular, it will be seen that the reel sections 82 and 84 are provided with openings 118 which are spaced longitudinally thereof. The openings 118 in the two sections 82 and 84 are in alignment and have received therethrough fasteners 120. The fasteners 120 also pass through an end of the tarpaulin 22 and are provided with clamp plates 122 which clamp the tarpaulin 22 to the reel sections 82 and 84. The bolts 120 also serve to secure the reel sections 82 and 84 together in adjusted position. Incidentally, the reel sections 82 and 84 may be in the form of split sleeves, as is best illustrated in Figure 12.

Referring once again to Figure 3 in particular, it will be seen that there is carried by each of the bearing plates 74 a latch member 124. The latch member 124 is pivotally mounted on a pivot pin 126 carried by the bearing plates 74. The latch member 124 is selectively engageable in the slot 94 in the sleeve 92 to lock the reel 80 against rotation. A similar latch member 124 will be carried by the other support arm 46 for engagement with the sleeve 98 in the same manner.

Referring now to Figure 14 in particular, it will be seen that there is illustrated a simplest form of drive means for the drive shaft 106. Threadedly engaged on the threaded end portion 108 of the drive shaft 106 is an internally threaded nut portion 128 of a crank handle 130. The crank handle 130 includes a handle portion 132 which is pivotally mounted so as to reduce the overall width of the crank handle 130.

Inasmuch as the reel 80 is of a shorter length than the width of the truck body 16 and since the drive shaft 106 telescopes within the reel 80, it will be apparent that when the drive shaft 106 is in a retracted position, the drive shaft 106 and the crank handle 130 may be disposed within the longitudinal projection of the truck body 16 so that there will be no projecting parts. When it is desired to wind the reel 80, it is merely necessary to pull outwardly on the crank handle 130 to lock the drive shaft 106 into engagement with the sleeve 104. This having been accomplished, the reel 80 may be rotated to reel the tarpaulin 22 back thereon. When it is desired to unreel the tarpaulin 22, it is merely necessary to permit the drive shaft 106 to be retracted within the reel 80 and the latch members 124 to be released. The tarpaulin 22 may then be pulled off of the reel 80 with the reel free wheeling.

Referring now to Figures 5 and 6 in particular, it will be seen that there is illustrated a modified form of drive means which are referred to in general by the reference numeral 134. The drive means 134 include a pulley 136 which is secured on the threaded end portion 108 of the drive shaft 106. Entrained over the drive pulley 136 is an endless drive belt 138. The drive belt 138 depends from the drive pulley 136 to a position where it may be easily grasped by one standing on the ground to rotate the drive pulley 136.

In order that the drive belt 138 may be retained in its position entrained over the drive pulley 136, there is provided an inverted channel-shaped guide bracket 140. The guide bracket is mounted on the drive shaft 106 and generally confines the drive sprocket 136. Extending between lower portions of the guide member 140 are rollers 142 for contracting the drive belt 138 and retaining it on the drive pulley 136. It is to be understood that the drive means 134 will move in and out with the drive shaft 106 so that when they are in inoperative positions, they are disposed within the longitudinal projections of the truck body 16, as is best illustrated in Figure 5.

Figure 2:
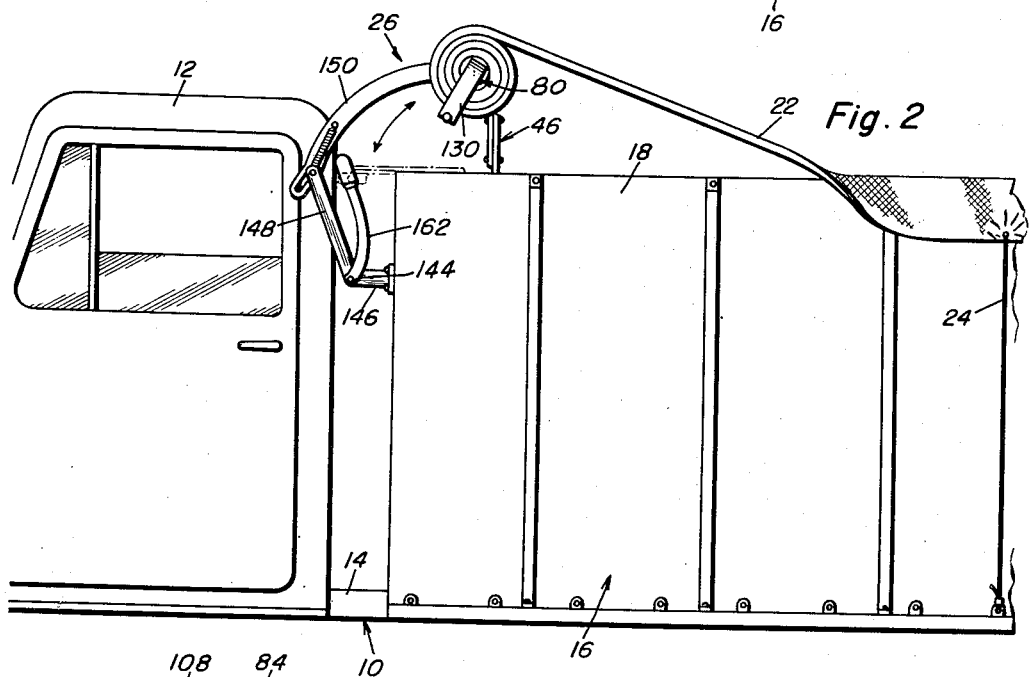
Figure 2 is a fragmentary side elevational view of the truck of Figure 1 and shows further the details of the tarpaulin reel.

When the tarpaulin 22 is reeled on the reel 80, the reel 80 is disposed in overlying relation with respect to the front portion of the truck body 16, as is best illustrated in Figures 2 and 3. However, when the tarpaulin 22 is moved to a cargo protecting position, it is desired that the forward end thereof be pulled into tight engagement with the forward part of the truck body 16. In order to accomplish this, it is desirable that the reel 80 be pivoted to a position disposed below the upper edge of the truck body 16 and between the cab 12 and the truck body 16, as is best illustrated in Figure 4.

In order to facilitate the selective positioning of the reel 80, there is disposed between the cab 12 and the front wall 20 of the truck body 16 a transverse operator shaft 144. The shaft 144 is disposed below the normal position of the reel 80 and is carried by a pair of mounting brackets 146 secured to the front surface of the front wall 20 projecting forwardly toward the cab 12. Secured to the shaft 144 for rotation therewith is a pair of crank arms 148. The crank arms 148 are connected to arcuate levers 150 whose upper ends are connected to the bearing plates 74. The levers 150 include lower straight portions 152 which are provided with elongated slots 154 extending left thereof. Positioned within each slot 154 is a pivot pin 156 of its associated crank arm 148. The pivot pin is urged into the upper end of the slot 154 by means of a tension member 158 which is connected at one end to the pivot pin 156 and at the opposite end to a remote point on the lever 150 by a fastener 160. The resilient mounting of the pivot pin 156 accommodates for any misalignment of the supporting linkage and mechanism for the reel 80.

In order to effect pivoting of the shaft 144 to select the position of reel 80, there is secured at opposite ends of the shaft 144 an operating arm 162 which includes a grip member 164. While the operating members 162 have been illustrated and described at opposite ends of the shaft 144, if desired, only one such operating arm 162 need be provided.

While the present invention has been specifically illustrated and described with respect to a farm truck body, it is to be understood that the invention is not intended to be so limited. The tarpaulin reel may be utilized in conjunction with any truck body utilizing a tarpaulin and, if desired, may be used with respect to open top trailers.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. In combination with an open top truck body, a truck tarpaulin reel assembly mounted on a front portion of said open top truck body, said reel assembly comprising a pair of support brackets mounted on inner surfaces of the sides of said truck body, support arms pivotally carried by said brackets, a reel extending between and journaled relative to said support arms, and reel positioning means connected to said support arms for selectively moving said reel from a tarpaulin storing position overlying said truck body to a tarpaulin tensioning position forward of and below the forward upper edge of said truck body.

2. In combination with an open top truck body, a truck tarpaulin reel assembly mounted on a front portion of said open top truck body, said reel assembly comprising a pair of support brackets mounted on inner surfaces of the sides of said truck body, support arms pivotally carried by said brackets, a reel extending between and journaled relative to said support arms, and reel positioning means connected to said support arms for selectively moving said reel from a tarpaulin storing position overlying said truck body to a tarpaulin tensioning position forward of and below the forward upper edge of said truck body, said support arms and said support bracket having releasable interfitting parts retaining said support arms in adjusted position.

3. In combination with an open top truck body, a truck tarpaulin reel assembly mounted on a front portion of said open top truck body, said reel assembly comprising a pair of support brackets mounted on inner surfaces of the sides of said truck body, support arms pivotally carried by said brackets, a reel extending between and journaled relative to said support arms, and reel positioning means connected to said support arms for selectively moving said reel from a tarpaulin storing position overlying said truck body to a tarpaulin tensioning position forward of and below the forward upper edge of said truck body, said support bracket including a first portion adapted to be fixedly secured to said truck body, and a second portion vertically slidably carried by said first portion, said support arms being connected to said second portion.

4. In combination with an open top truck body, a truck tarpaulin reel assembly mounted on a front portion of said open top truck body, said reel assembly comprising a pair of support brackets mounted on inner surfaces of the sides of said truck body, support arms pivotally carried by said brackets, a reel extending between and journaled relative to said support arms, and reel positioning means connected to said support arms for selectively moving said reel from a tarpaulin storing position overlying said truck body to a tarpaulin tensioning position forward of and below the forward upper edge of said truck body, said reel positioning means including a transverse operator shaft, means connected to said shaft mounting said shaft on the front wall of said truck body, an operating crank on at least one end of said shaft, and linkage on opposite ends of said shaft connecting said shaft to said support arms.

5. In combination with an open top truck body, a truck tarpaulin reel assembly mounted on a front portion of said open top truck body, said reel assembly comprising a pair of support brackets mounted on inner surfaces of the sides of said truck body, support arms pivotally carried by said brackets, a reel extending between and journaled relative to said support arms, and reel positioning means connected to said support arms for selectively moving said reel from a tarpaulin storing position overlying said truck body to a tarpaulin tensioning position forward of and below the forward upper edge of said truck body, cooperating latch means carried by one end of said reel and one of said support arms for selectively preventing rotation of said reel.

6. In combination with an open top truck body, a truck tarpaulin reel assembly mounted on a front portion of said open top truck body, said reel assembly comprising a pair of support brackets mounted on inner surfaces of the sides of said truck body, support arms pivotally carried by said brackets, a reel extending between and journaled relative to said support arms, and reel positioning means connected to said support arms for selectively moving said reel from a tarpaulin storing position overlying said truck body to a tarpaulin tensioning position forward of and below the forward upper edge of said truck body, said reel being formed in telescoping sections whereby said reel may be mounted in truck bodies of different widths.

7. A truck tarpaulin reel assembly adapted to be mounted on a front portion of an open top truck body, said reel assembly comprising a pair of support brackets adapted to be mounted on inner surfaces of the sides of the truck body, support arms pivotally carried by said brackets, a reel extending between and journaled relative to said support arms, means for rotating said reel, said means including a drive shaft, said drive shaft being telescoped within one end of said reel, latch means within said reel for locking said reel and drive shaft, said latch means being operable upon movement of said drive shaft to an extended position, drive means for said drive shaft mounted on said drive shaft.

8. A truck tarpaulin reel assembly adapted to be mounted on a front portion of an open top truck body, said reel assembly comprising a pair of support brackets adapted to be mounted on inner surfaces of the sides of the truck body, support arms pivotally carried by said brackets, a reel extending between and journaled relative to said support arms, means for rotating said reel, said means including a drive shaft, said drive shaft being telescoped within one end of said reel, latch means within said reel for locking said reel and drive shaft, said latch means being operable upon movement of said drive shaft to an extended position, drive means for said drive shaft mounted on said drive shaft, said drive means being in the longitudinal projection of the truck body when said drive shaft is in a retracted position.

9. A truck tarpaulin reel assembly adapted to be mounted on a front portion of an open top truck body, said reel assembly comprising a pair of support brackets adapted to be mounted on inner surfaces of the sides of the truck body, support arms pivotally carried by said brackets, a reel extending between and journaled relative to said support arms, means for rotating said reel, said means including a drive shaft, said drive shaft being telescoped within one end of said reel, latch means within said reel for locking said reel and drive shaft, said latch means being operable upon movement of said drive shaft to an extended position, drive means for said drive shaft mounted on said drive shaft, said drive means being in the longitudinal projection of the truck body when said drive shaft is in a retracted position, means within said reel normally urging said drive shaft to said retracted position.

10. A truck tarpaulin reel assembly adapted to be mounted on a front portion of an open top truck body, said reel assembly comprising a pair of support brackets adapted to be mounted on inner surfaces of the sides of the truck body, support arms pivotally carried by said brackets, a reel extending between and journaled relative to said support arms, means for rotating said reel, said means including a drive shaft, said drive shaft being telescoped within one end of said reel, latch means within said reel for locking said reel and drive shaft, said latch means being operable upon movement of said drive shaft to an extended position, drive means for said drive shaft mounted on said drive shaft, said drive means being in the form of a foldable crank handle.

11. A truck tarpaulin reel assembly adapted to be mounted on a front portion of an open top truck body, said reel assembly comprising a pair of support brackets adapted to be mounted on inner surfaces of the sides of the truck body, support arms pivotally carried by said brackets, a reel extending between and journaled relative to said support arms, means for rotating said reel, said means including a drive shaft, said drive shaft being telescoped within one end of said reel, latch means within said reel for locking said reel and drive shaft, said latch means being operable upon movement of said drive shaft to an extended position, drive means for said drive shaft mounted on said drive shaft, said drive means being in the form of a drive pulley mounted on said drive shaft, a flexible drive member entrained over said drive pulley and depending therefrom for selectively rotating said drive pulley.

12. A truck tarpaulin reel assembly adapted to be mounted on a front portion of an open top truck body, said reel assembly comprising a pair of support brackets adapted to be mounted on inner surfaces of the sides of the truck body, support arms pivotally carried by said brackets, a reel extending between and journaled relative to said support arms, and reel positioning means connected to said support arms for selectively moving said reel from a tarpaulin storing position overlying the truck body to a tarpaulin tensioning position forward of and below the forward upper edge of the truck body, a drive shaft connected to said reel, a drive pulley on said drive shaft, a flexible drive member entrained over said drive pulley, and a guide assembly mounted on said drive shaft for retaining said drive member on said drive pulley.

13. A truck tarpaulin reel assembly adapted to be mounted on a front portion of an open top truck body, said reel assembly comprising a pair of support brackets adapted to be mounted on inner surfaces of the sides of the truck body, support arms pivotally carried by said brackets, a reel extending between and journaled relative to said support arms, means for rotating said reel, said means including a drive shaft, said drive shaft being telescoped within one end of said reel, latch means within said reel for locking said reel and drive shaft, said latch means being operable upon movement of said drive shaft to an extended position, drive means for said drive shaft mounted on said drive shaft, and reel positioning means connected to said support arms for selectively moving said reel from a tarpaulin storing position overlying the truck body to a tarpaulin tensioning position forward of and below the forward upper edge of the truck body.

14. A truck tarpaulin reel assembly adapted to be mounted on a front portion of an open top truck body, said reel assembly comprising a pair of support brackets adapted to be mounted on inner surfaces of the sides of the truck body, support arms pivotally carried by said brackets, a reel extending between and journaled relative to said support arms, means for rotating said reel, said means including a drive shaft, said drive shaft being telescoped within one end of said reel, latch means within said reel for locking said reel and drive shaft, said latch means being operable upon movement of said drive shaft to an extended position, drive means for said drive shaft mounted on said drive shaft, and reel positioning means connected to said support arms for selectively moving said reel from a tarpaulin storing position overlying the truck body to a tarpaulin tensioning position forward of and below the forward upper edge of the truck body, said reel positioning means being disposed in the longitudinal projection of the truck body.

15. A truck tarpaulin reel assembly adapted to be mounted on a front portion of an open top truck body, said reel assembly comprising a pair of support brackets adapted to be mounted on inner surfaces of the sides of the truck body, support arms pivotally carried by said brackets, a reel extending between and journaled relative to said support arms, means for rotating said reel, said means including a drive shaft, said drive shaft being telescoped within one end of said reel, latch means within said reel for locking said reel and drive shaft, said latch means being operable upon movement of said drive shaft to an extended position, drive means for said drive shaft mounted on said drive shaft, and reel positioning means connected to said support arms for selectively moving said reel from a tarpaulin storing position overlying the truck body to a tarpaulin tensioning position forward of and below the forward upper edge of the truck body, said drive means being in the longitudinal projection of the truck body when said drive shaft is in a retracted position.

16. A truck tarpaulin reel assembly adapted to be mounted on a front portion of an open top truck body, said reel assembly comprising a pair of support brackets adapted to be mounted on inner surfaces of the sides of the truck body, support arms pivotally carried by said brackets, a reel extending between and journaled relative to said support arms, means for rotating said reel, said means including a drive shaft, said drive shaft being telescoped within one end of said reel, latch means within said reel for locking said reel and drive shaft, said latch means being operable upon movement of said drive shaft to an extended position, drive means for said drive shaft mounted on said drive shaft, and reel positioning means connected to said support arms for selectively moving said reel from a tarpaulin storing position overlying the truck body to a tarpaulin tensioning position forward of and below the forward upper edge of the truck body, said drive means and said reel positioning means being disposed in the longitudinal projection of the truck body.

References Cited in the file of this patent

UNITED STATES PATENTS

| | | |
|---|---|---|
| 1,518,402 | Feigelman | Dec. 9, 1924 |
| 2,536,571 | Sanguin et al. | Jan. 2, 1951 |
| 2,616,636 | Aden | Nov. 4, 1952 |
| 2,616,637 | Schroeml | Nov. 4, 1952 |